Feb. 10, 1959
R. DAVIDSON
2,873,304
SEALING MEANS FOR CAPACITORS
Filed May 2, 1952
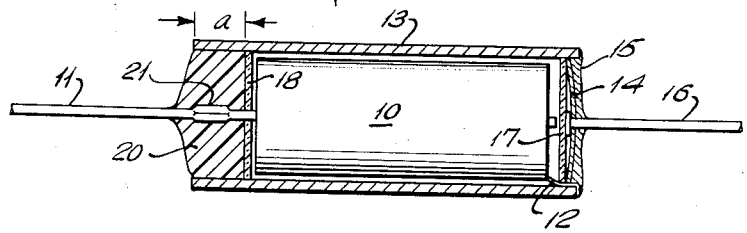
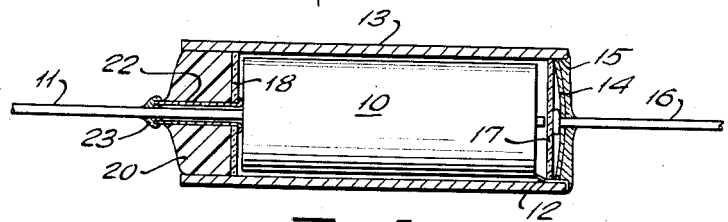
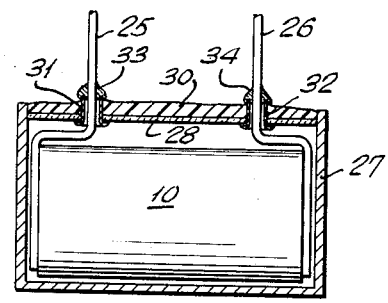
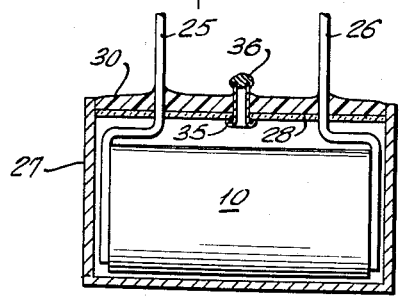
INVENTOR.
RONALD DAVIDSON
BY
ATTORNEY

United States Patent Office

2,873,304
Patented Feb. 10, 1959

2,873,304

SEALING MEANS FOR CAPACITORS

Ronald Davidson, Hounslow, England, assignor to Cornell-Dubilier Electric Corporation, South Plainfield, N. J., a corporation of Delaware Application May 2, 1952, Serial No. 285,693

1 Claim. (Cl. 174—52)

The present invention relates to electrical capacitors and other electrical devices, and more particularly to electrical capacitors of the kind in which the electrodes and insulating spacers are constituted by flexible elements of sheet material rolled about a central axis so that the convolutions of the electrode elements, such for example as metal foil, are separated by the convolutions of the flexible spacer elements, such for example as paper or other flexible insulating material, the rolled unit being usually treated with a suitable impregnant and mounted in a sealed moistureproof casing or container.

An object of the present invention is to provide an improved form of end seal for such capacitor unit or other electrical device.

Other objects of the invention are the provision of a sealed wound electrical capacitor which may be manufactured simply and expeditiously; which will be sealed effectively against moisture under varying operating conditions; and wherein the sealing element is firmly bonded to the container and terminal leads of the capacitor without the use of any intermediary bonding material.

With the foregoing objects in view, a method of manufacturing an electrical capacitor according to the invention comprises the steps of inserting a capacitor unit into a moistureproof container, such as a tube or cup, inserting a closure member of insulating material, such as a mica washer, into the container so that said member is spaced from an open end of the container, inserting into the space between the said member and the said end of the container a body of resinous sealing material, and baking or curing said material until it has hardened or polymerized and adhered to the container, to form a hermetic seal for the capacitor or other electrical device mounted in the container.

The invention also relates to an electrical capacitor or equivalent electrical device comprising a moistureproof container such as a tube or cup, with the capacitor unit or other device mounted therein and having an end inwardly spaced from the corresponding end of the container, a closure member of insulating material adjacent to the said end but spaced therefrom, and a hardened sealing plug of resinous material located in the space or recess thus formed in the end of and adhering to the container.

In order to successfully carry the invention into effect, there are certain requirements regarding the characteristics and properties of the resinous sealing material, both with regard to producing a perfect seal having a high dielectric constant, humidity resistance and low shrinkage upon hardening, as well as regards easy application or introduction of the material in the molten or viscous state into the sealing space or recess, substantially without requiring any pressure during curing or hardening, to prevent injury to the caapcitor unit or other electrical device. In addition, the material should have a high affinity for the material of the container, such as metal, in order to insure a permanent and hermetic seal or bond.

It has been found that particularly suitable resinous materials for the above purpose are the thermosetting ethoxylene bonding resins or condensation products of ethylene oxide. Examples of such a casting resin suitable for the invention and which set without the evolution of any volatile substances are the condensation products of polyarylethylene oxide compounds with acid anhydrides, amines and other compounds as sold under the registered trade mark "Araldite," "Hysol" and others. This material adheres firmly to the moistureproof container and to the terminal lead of the capacitor. In such case, baking or condensation is carried out at a temperature of not less than approximately 150° C. until the resin has hardened. As is understood, other thermosetting bonding and casting resins, such as polyethylene or other polyesters heated or dissolved in styrene may be used for the purpose of the invention, with or without a suitable hardener or catalyst.

In a preferred embodiment of the invention, the capacitor unit itself may be manufactured by the method described in U. S. Patent No. 2,522,718. It is then inserted into a moistureproof container such as a tube or cup so that the end to which the sealing plug of resinous material is to be applied is spaced from the corresponding end of the container. A closure washer of insulating material, such as mica, is then introduced into the container end so that a recess is left at the container end to accommodate a plug or body of resinous sealing material. The latter is then baked, during which operation the other end of the container, where it is in the form of a tube, is left open. This enables the capacitor unit, if desired to be treated with an impregnant such, for example, as mineral wax, oil jelly, a chlorinated naphthalene, a chlorinated diphenyl, a wax-like hydrogenated or hydroxylated castor oil, or any other known impregnating material. The open end of the tube is then sealed in any convenient manner. Thus, an insulating washer, for example of mica, may be laid in said open end, whereupon a metal washer electrically and mechanically connected to a terminal lead is inserted over the insulating washer and the terminal assembly soldered in the mouth of the moistureproof tube.

If desired, the capacitor unit may be inserted into the tube subsequent to the baking of the resinous sealing plug and the capacitor unit may be impregnated before sealing the end of the tube with the resinous material. Thus, the moistureproof tube may be prepared with a closure washer and sealing plug of resinous material at one end, the closure washer having a small axially upstanding eyelet passing through the seal. After baking and hardening of the plug, the capacitor unit is inserted into the moistureproof tube or cup with its terminal wire projecting through said eyelet and secured thereto as by soldering. Impregnation of the capacitor unit may then be carried out through the eyelet which is then closed by soldering thereto the terminal wire.

In order to accelerate the hardening or polymerization process during heating, the resinous material may be intimately admixed with any convenient catalyst.

The invention is especially suitable in the manufacture of miniature type or midget capacitors for use in proximity fuzes or the like, for which a small ceramic bead or plug is at present used silvered around a central hole and on a band around its outside, so that it may be soldered into the outer tube and the projecting terminal wire may be soldered around the hole. This arrangement has the disadvantage of an undue number of rejects, due to the difficulty of obtaining a good enough silver coating and solder connection thereto on the very small ceramic beads.

The resin seal according to the present invention, on the other hand, has proved to be very effective since it is possible to secure a bond to both the terminal wire and the metal case without the use of an intermediary bonding material and to obtain a hermetic seal which stands up to humidity tests for a prolonged period.

The invention will be better understood by the following detailed description considered in conjunction with the accompanying drawing, forming part of this specification, and in which Figure 1 is a cross-sectional view of a sealed tubular capacitor unit constructed in accordance with the principles of the invention;

Figure 2 shows a modification of the unit according to Figure 1; and

Figures 3 and 4 show alternative constructions of a sealed capacitor according to the invention.

Like reference numerals denote like parts in the several views of the drawing.

Referring more particularly to Figures 1 and 2, two alternative arrangements of the seal are shown. In both figures, numeral 10 represents a rolled condenser section, such as a midget paper capacitor of about ½" length and ⅛" diameter, made in accordance with any known manufacturing process, such as described by the above-mentioned U. S. patent. One of the terminal wires or connections of this rolled condenser section projects from its center at 11, while the other terminal connection may comprise a projecting metal tag 12 inserted between adjacent winding turns of the roll or unit 10 and placed over the edge of the metal tube container 13 to which it is secured by soldering in place the metal closure disc 14, as for example by filling in the end of the tube 13 with solder, as shown at 15.

In order to prevent any risk of short-circuit between the terminal wire 16 which projects from and is attached to the disc 14, an insulating disc 17 of mica or the like is inserted between the metal disc 14 and the adjacent end of the section 10.

At the other end of the tubular container 13 a similar insulating disc or washer 18 is inserted, which may be of mica, pressboard, or other convenient insulating material, and is slipped over the projecting terminal wire 11 so as to leave a short length space, as indicated at a, at the open end of the container tube 13. This space is filled with the resin filling 20 by pouring into the space, while the capacitor is held in a vertical position in any convenient stand or rack.

A suitable resin filling 20 of the type described, in heated condition or dissolved in a suitable solvent, is then poured into the end space of the tube 13 and baked or hardened to produce a hermetic seal both with the container 13 and terminal wire 11.

Alternatively, the casting resin is placed in a vessel and heated to a suitable temperature to allow the resin to become viscous or liquid. When this stage has been reached a suitable weight of hardener or catalyst is added to produce a saturated solution and the mixture thoroughly stirred until the hardener is dissolved. This solution can be directly poured into the end space of the container for the capacitor or other electrical device. The capacitor with the resin in position in the open end is then baked or cured for the requisite period to secure polymerization of the resin, to form a hard plug.

The curing time for the end seal will depend on the type of capacitor element or other electrical device. If the capacitor contains paper as the dielectric, the curing temperatures must be restricted and the time increased, while with other types of elements, such as mica, or where the element is mounted after the end seal has been made, the curing time can be considerably reduced. The importance of the particular type of resin is that it "wets" the metal surfaces and adheres firmly thereto.

Where, as in Figure 1, a simple plug of resin is used, it is convenient to deform the terminal wire, as indicated at 21, such as by squeezing it into a square, rectangular or flattened shape or otherwise deforming it for a short distance inside the resin plug. This provides a stronger mechanical bond, to prevent twisting of the wire terminal in the resin and thereby breaking the sealing.

In the alternative assembly shown in Figure 2, a tubular eyelet 22 is inserted through the insulating disc 18 so that the resin adheres to the casing 13 and to the outer surface of the eyelet 22. The terminal wire 11 passes through the center of this eyelet and is soldered to its outer end, as indicated at 23, in order to complete the seal.

In the case of the arrangement of Figure 1, the baking of the resin to polymerize it to a hard plug can only be carried out on the container containing the wound capacitor section 10, so that the temperature of polymerization must be limited to about 100° to 120° C. in order to prevent charring or other decomposition of the paper or dielectric material in the capacitor section. The actual impregnation of the section can be carried out subsequently to the hardening of the resin through the other end of the casing 13 which is left open for this purpose, so that the soldering of disc 14 into place makes the final operation after impregnation. Although this arrangement is perfectly practical, a disadvantage may be that the limitation of the curing temperature to 100° to 120° C. implies that it requires a relatively long curing period, i. e. from 12 to 24 hours, whereas by raising the temperature to 150° C. or more, this time can be very materially shortened.

In the case of the alternative arrangement shown in Figure 2, this shorter curing time at a higher temperature is possible since the plug can be cured in place in the casing 13 before the capacitor section 10 is inserted in that casing. The section complete with its terminal wire 11 is then inserted through the open end of the casing 13 which is subsequently closed by soldering the disc 14 into position after impregnation of the capacitor section, the final operation being the soldering of the terminal wire 11 to the eyelet 22 at its open end 23. Alternatively, a dry unimpregnated condenser section 10 may be mounted in the casing, the disc 14 soldered in place, and impregnation carried out through the eyelet 22 before the latter is closed by soldering at 23.

Figures 3 and 4 represent similar constructions using rectangular capacitor casings. In these two figures, the capacitor section which may be of the cylindrical or flat plate type, as desired, is again indicated at 10, with terminal wires 25 and 26 soldered or otherwise attached to the electrodes of the condenser and projecting upwards, in a manner well known. The casing 27 is provided with an insulating disc, washer or plate 28 to form a closure for its open end and to leave a space or recess at the top which can be filled with the resin layer 30.

In Figure 3, two eyelets 31 and 32 are shown passing through the plate 28 so that the terminal wires 25 and 26 passing through these eyelets may be soldered thereto, as indicated at 33 and 34, respectively. With the arrangement of Figure 3, either an impregnated section can be inserted in the casing and the resin subsequently cured in place to seal the casing, or preferably dry unimpregnated section may be assembled in the casing and the impregnation carried out through the eyelets 31 and 32 before the latter are closed by soldering at 33 or 34.

In the arrangement of Figure 4, the resin directly adheres to and seals the terminal wires 25 and 26, the latter, if desirable, being deformed where they pass through the resin seal as already indicated in Figure 1. In this assembly arrangement, a single eyelet 35 is mounted in the insulating plate 28, the eyelet being left open to permit of the vacuum impregnation of the capacitor section 10 after the resin seal 30 is cured to a hard mass and adheres both to the casing 27, the eyelet 35, as well as to the terminal wires 25 and 26. The eyelet 35 is subsequently sealed, as for example by soldering at 36 after the impregnation is completed.

Similar remarks as to the curing times and temperatures apply as already given above, but in the case of Figures 3 and 4 the capacitor section 10 is necessarily inside the casing 27 when the resin is poured into the top and is cured so that the temperature must be limited to the lower figures (that is 100° to 120° C.), if the capacitor uses a paper dielectric, with the necessary longer curing times in order to prevent damage to the capacitor section itself.

While it will be understood that the invention is useful in connection with the manufacture of various types of capacitors, its greatest field of utility is for the small tubular miniature capacitor, as shown in Figures 1 and 2, for which the use of alternate sealing methods such as soldering is extremely difficult and costly. By the invention an efficient and permanent seal is obtained without the use of any intermediate sealing or bonding material, such as solder, thus not only insuring a perfect bond or hermetic seal, but resulting in a great simplification of the manufacturing process and insuring capacitors of constant characteristics with a minimum of rejects or defective units.

In the foregoing, the invention has been described with reference to a specific illustrative device. It will be evident, however, that modifications and variations, as well as the substitution of equivalent elements and steps for those shown and disclosed herein for illustration, may be made without departing from the broader scope and spirit of the invention as defined in the appended claims. The specification and drawing are accordingly to be regarded in an illustrative rather than in a limiting sense.

I claim:

In combination, a container for an electrical capacitor having an open end and a space to receive a capacitor unit at a distance from said open end, closure means for said open end, including an insulating washer disposed in substantially liquid-tight engagement with the side walls of said container at a location inwardly spaced from the open end thereof, a hollow eyelet sleeve supported by said washer and extending through said washer to the open end of the container, an insulating sealing plug disposed between the washer and the open end of the container comprising a hardened and permanently thermoset resin bonded to the washer, the inner walls of the container and the outer walls of the eyelet sleeve, said eyelet sleeve having a central channel extending from the space in the container, to receive the capacitor, to the outside of the closure means whereby the terminal of a capacitor, received in the space, may extend through said channel and said capacitor may be impregnated through said channel.

References Cited in the file of this patent

UNITED STATES PATENTS

| | | |
|---|---|---|
| 1,856,392 | Kevelson | May 3, 1932 |
| 2,596,134 | Dorst | May 13, 1952 |
| 2,611,793 | Simpson | Sept. 23, 1952 |
| 2,636,073 | Clarke | Apr. 21, 1953 |

FOREIGN PATENTS

| | | |
|---|---|---|
| 478,582 | Great Britain | Jan. 20, 1938 |
| 631,402 | Great Britain | Nov. 2, 1949 |

OTHER REFERENCES

Publication I, "Ethoxylines," by E. Preiswerk and C. Meyerhans, Electrical Manufacturing, July 1949, pages 78–81, 164 and 166. (Copy available in Scientific Library.)